June 5, 1956  S. A. ERIKSSON  2,748,431
DEVICES FOR MOUNTING WINDOWS
Filed Jan. 17, 1952  2 Sheets-Sheet 1

INVENTOR
SVEN AXEL ERIKSSON
BY
Busser & Harding
ATTORNEYS

June 5, 1956  S. A. ERIKSSON  2,748,431
DEVICES FOR MOUNTING WINDOWS
Filed Jan. 17, 1952  2 Sheets-Sheet 2
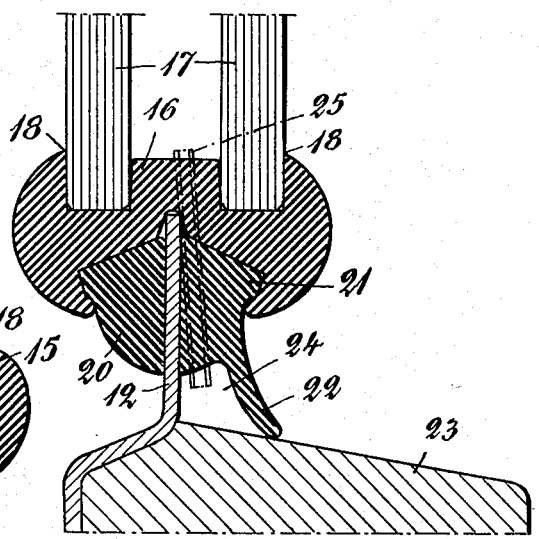
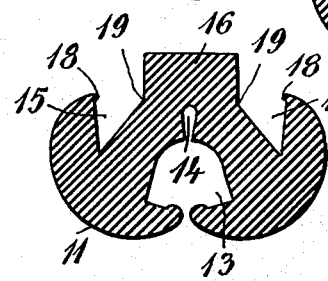
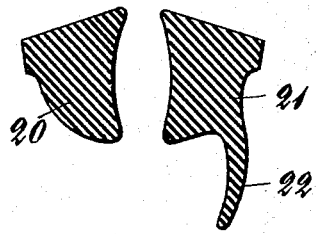
INVENTOR
SVEN AXEL ERIKSSON
BY
ATTORNEYS United States Patent Office 2,748,431
Patented June 5, 1956

2,748,431

DEVICES FOR MOUNTING WINDOWS

Sven Axel Eriksson, Helsingfors, Finland

Application January 17, 1952, Serial No. 266,984

Claims priority, application Sweden January 19, 1951

2 Claims. (Cl. 20—56.4)

The present invention relates to a device for mounting windows, particularly wind-shields in automobiles or like vehicles.

With this purpose in view it has been proposed to employ rubber mounting strips provided with grooves for receiving the window pane or panes, if double windows or wind-shields are used, and another diametrically opposed groove for fastening the mounting strip upon the edge of a body panel surrounding the window opening. It has also been proposed in order to ensure that the strip is securely attached to this body panel and the window pane or panes are securely gripped in the groove of the strip to form the strip with lateral grooves in which special wedging strips were inserted. It has been found, however, that the use of such lateral grooves with wedging strips tends to weaken the strip and reduce its ability of tightly gripping the window panes are particularly its ability to adhere firmly to the body panel. Due to these lateral grooves the mounting strip is weakened such that it does not provide sufficient resistance against outward bending of those portions of the strip which include the groove adapted to receive the edge of the body panel.

In accordance with the present invention this disadvantage is eliminated thereby that the groove of the mounting strip corresponding to the body panel is shaped such that at first it widens inwardly and thereupon becomes narrower to a width corresponding to the thickness of the body panel, so that the wedging strips may be inserted directly into the wider portion of the grooves at opposite sides of the body panel and thus directly grip the same and simultaneously effect a deformation of the strip such that the walls of the window receiving groove or grooves are caused to tightly grip the edges of the pane or panes.

In order to facilitate the installation, particularly in the case of double windows, in a preferred form of the invention the cross-section of the mounting strip before insertion of the wedging strips is such that the top edges of the outer walls of the grooves adapted to receive the window panes are substantially of the same level as the lower edges of the opposite walls of said grooves.

Another object of this invention is to eliminate the disadvantage, which is encountered in the case of wind-shields with double glasses, that air may enter from the surrounding atmosphere into the space between the panes or the air between the panes may be pressed out on account of temperature variations, which results in a possibility of fogging upon the window glasses.

This disadvantage is obviated in accordance with this invention thereby that the one of the wedging strips which is arranged at the interior face of the body panel is provided with a skirt extending downwardly towards and engaging the instrument panel or the like so that a confined chamber is formed between the body panel, the instrument panel and the skirt, said chamber communicating with the space between the window panes through one or more conduits or the like so that the chamber will serve as a pressure compensating chamber.

These and other features characteristic of the present invention will be described in detail below with reference to the embodiments illustrated in the accompanying drawings.

Fig. 1 shows a cross-section of one embodiment of the mounting strip of the present invention; Fig. 2 is a cross-section of a corresponding wedging strip; Fig. 3 shows a detail; and Fig. 4 shows in cross-section the mounting strip attached to the body panel and a double wind-shield fitted in the grooves thereof.

Fig. 6 illustrates in cross-section another embodiment of a mounting strip before its attachment upon the body panel.

Fig. 7 shows a cross-section of a double window mounted with the aid of the strip shown in Fig. 6.

Fig. 8 illustrates a cross-section through the wedging strips associated with the mounting strip of Fig. 6.

Figure 1:
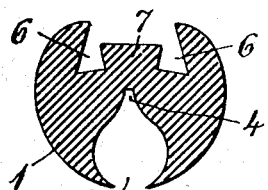
Figure 3:
Figure 2:
Figure 4:
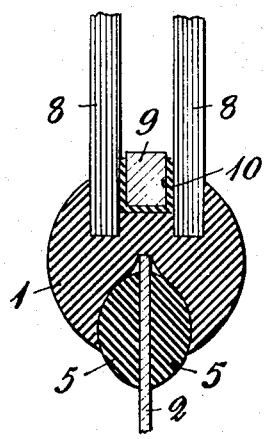
Figure 5:
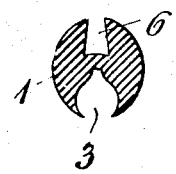
Fig. 5 shows a cross-section of the mounting strip adapted to receive a single window.

In the embodiment shown in Figs. 1 to 4 the numeral 1 designates the mounting strip which is provided with a longitudinal groove 3 for attaching the strip to the edge of a body panel 2. This groove first widens inwardly and then becomes more narrow. Preferably the groove 3 has a partially circular cross-section and at the bottom thereof it continues in a groove portion 4 having a width corresponding to the thickness of the body panel 2. The wedging strips 5 which as seen from Figure 4 are adapted to be inserted into the groove 3 at opposite sides of the panel 2, are formed with a cross-section corresponding in shape to the circular shape of the groove. In diametrical relationship to the groove 3 the strip 1 has two grooves 6, the width of which increases inwardly, and between said grooves there remains a ridge 7. In these grooves 6 the window panes 8 are inserted under expansion of the upper portions of the grooves and thereupon there may be placed between the panes a spacer formed as a metal strip 9 inserted into a rubber strip 10 of channel section. Fig. 5 shows the form of mounting strip employed in the case of a single window pane.

In the embodiment shown in Figs. 6 to 8 the numeral 11 designates the mounting strip, which similarly to the embodiment of Figs. 1 to 4 is provided with a longitudinal groove 13 for attaching the strip to the body panel 12. This groove first widens considerably and thereupon becomes narrower in the inward direction and finally at the bottom of the groove there is a portion 14 corresponding to the thickness of the body panel 12. In diametrical relation to the groove 3 the strip is provided with two grooves 15 between which there is a ridge 16 and adapted to receive the window panes 17. As shown in Fig. 6, the mounting strip 11 has before assembly a shape such that the top edges 18 of the outer walls of the grooves 15 are substantially of the same level as the lower edges 19 of the opposite walls. Thus the window panes may be inserted in the grooves 15 without any difficulties and without any special tools. After the window panes are placed in position, the wedging strips 20 and 21 are inserted in the groove 13 at opposite sides of the body panel 12, said wedging strips serving to press the outer walls of the grooves 15 upwardly and inwardly, so that the panes are gripped securely in the grooves 15. The wedging strips 20 and 21 will of course also grip the body panel 12 and thus securely hold the mounting strip with the window panes inserted therein against the body panel.

As shown in Figure 8 those faces of the wedging strips which engage the body panel 12 exhibit prior to their insertion a concave shape in order to obtain a suction effect on the panel 12 when the strips are inserted and thus additionally improving the secure holding of the strip.

The wedging strip 21 which is adapted to be inserted at the interior face of the body panel is according to the invention desirably provided with a downwardly extending skirt 22 which, as shown in Fig. 7, is adapted when the strip is inserted, to engage the upper surface of the instrument panel 23 or the like in sealing relationship in order to form a confined chamber 24, which through one or more conduits 25 or openings communicates with the space between the window panes 17 so that the chamber will serve as a pressure compensating chamber. As stated above, this ensures against the possibility of moist air entering between the panes when the pressure drops in the space between the window panes and causing fogging.

The invention is of course not limited to the shown and specifically described embodiments but may be modified in a number of ways within the scope of the invention.

Having now particularly described the nature of my invention and the manner of its operation what I claim is:

1. A device for mounting a window including a resilient mounting strip provided with a longitudinal groove adapted to receive the edge of a mounting panel surrounding a window opening and a pair of longitudinal grooves diametrically opposed to the first mentioned mounting groove and adapted to receive a pair of window panels, said first mentioned groove being adapted to receive the edge of a panel at the base of the groove and having a cross-sectional shape which first widens inwardly and thereafter narrows to an innermost width corresponding to the thickness of the mounting panel, and a pair of wedging strips adapted to be inserted into said first mentioned groove on opposite sides of a mounting panel therein, said wedging strips each being formed to engage the sides of a mounting panel adjacent thereto in said groove and to effect deformation of the mounting strip such that the walls of the window receiving grooves are caused to tightly grip adjacent window panels therein, said mounting strip being formed with the top edges of the outer walls of the window panel receiving grooves being at approximately the same level as the lower edges of the inner walls of the grooves before the insertion of wedging strips in the mounting panel receiving groove.

2. A window structure including a body panel surrounding a window opening and having a panel member extending generally perpendicular from the inside of the body panel, a pair of spaced window panels positioned in said opening and a mounting strip assembly positioning said window panels in said window opening, said mounting strip assembly comprising a resilient mounting strip provided with a longitudinal groove receiving the edge of the body panel surrounding the window opening and a pair of spaced longitudinal grooves diametrically opposed to the first mentioned mounting groove and receiving the pair of spaced window panels, said first mentioned groove receiving the edge of the panel at the base of the groove and having a cross-sectional shape which first widens inwardly and thereafter narrows to an innermost width corresponding to the thickness of the body panel, and a pair of wedging strips adapted to be inserted into said first mentioned groove on opposite sides of the body panel, said wedging strips each being formed to engage the sides of the body panel adjacent thereto and to effect deformation of the mounting strip such that the walls of the window receiving grooves are caused to tightly grip adjacent window panels, the one of the wedging strips disposed at the interior face of the body panel being provided with a skirt extending downwardly below the lowermost portion of the strip towards and engaging the perpendicularly extending panel member to form a confined chamber between the body panel, the panel member and the skirt, and means providing communication between the chamber and the space between the window panels.

References Cited in the file of this patent

UNITED STATES PATENTS

| | | |
|---|---|---|
| 2,189,137 | Eichner | Feb. 6, 1940 |
| 2,205,538 | Owen | June 25, 1940 |
| 2,623,250 | Chilton | Dec. 30, 1952 |
| 2,679,075 | Bradley | May 25, 1954 |

FOREIGN PATENTS

| | | |
|---|---|---|
| 639,629 | Great Britain | July 5, 1950 |